United States Patent
Yamane

[11] Patent Number: 5,978,028
[45] Date of Patent: Nov. 2, 1999

[54] IMAGE REPRODUCTION APPARATUS HAVING A SUPPORT FOR VERTICAL AND HORIZONTAL IMAGE REPRODUCTION

[75] Inventor: Akira Yamane, Minami-ku, Japan

[73] Assignee: Elmo Company, Limited, Japan

[21] Appl. No.: 08/786,328

[22] Filed: Jan. 23, 1997

[30] Foreign Application Priority Data

Jan. 26, 1996 [JP] Japan ..................................... 8-033054

[51] Int. Cl.⁶ ................................................. H04N 5/225
[52] U.S. Cl. ........................... 348/373; 348/375; 248/558
[58] Field of Search .................... 348/373, 376, 348/374, 375; 396/419, 428; 248/558, 124.1, 126

[56] References Cited

U.S. PATENT DOCUMENTS

| | | | |
|---|---|---|---|
| 3,699,252 | 10/1972 | Jackson | 348/373 |
| 3,704,848 | 12/1972 | Trebes et al. | 248/558 |
| 4,963,986 | 10/1990 | Fukuyama et al. | 348/373 |
| 5,247,330 | 9/1993 | Ohyama et al. | 348/373 |
| 5,374,971 | 12/1994 | Clapp et al. | 348/376 |
| 5,550,588 | 8/1996 | Hayashi | 348/373 |
| 5,689,300 | 11/1997 | Shibata et al. | 348/373 |

OTHER PUBLICATIONS

VP–S Uchida Catalog, Issued in Mar. 1995.

*Primary Examiner*—Tuan Ho
*Attorney, Agent, or Firm*—Ostrolenk, Faber, Gerb & Soffen, LLP

[57] ABSTRACT

A TV camera unit is supported by a camera support member having an arm-receiving hole into which an arm is inserted. When a camera support shaft protruded upward from a camera base of the camera support member is fitted into a downward attitude holding aperture that is formed in the front face of the TV camera unit to be parallel to the optical axis of a lens of the TV camera unit, the TV camera unit is supported by the camera base and set at a downward shooting position where the lens faces downward. When the camera support shaft is fitted into a horizontal attitude holding aperture that is formed in the bottom face of the TV camera unit to be perpendicular to the optical axis of the lens, the TV camera unit is set at a horizontal shooting position where the lens faces in the horizontal direction.

20 Claims, 11 Drawing Sheets

IMAGE REPRODUCTION APPARATUS HAVING A SUPPORT FOR VERTICAL AND HORIZONTAL IMAGE REPRODUCTION

BACKGROUND OF THE INVENTION

1. Field of the Invention

The present invention relates to an image reproduction apparatus for obtaining an image of a material shot with a TV camera unit, and more particularly to an image reproduction apparatus having a TV camera unit and a camera support for supporting the TV camera unit that are separable from each other.

2. Description of the Prior Art

As depicted in FIG. 11, a conventional image reproduction apparatus VP typically includes a material table DD and a TV camera unit CM for shooting a material DC mounted on the material table DD, which are linked with each other via an arm AR or the like. Image signals output from the TV camera unit CM with a lens facing down are sent to a monitor MT, so that images of the material DC mounted on the material table DD are shown to the audience. For diversified applications of the image reproduction apparatus, the TV camera unit CM is rotatably attached to the arm AR and can be rotated in the horizontal direction to be used as a video camera for shooting peripheral objects. The use of such a TV camera unit allows facial images of the user who gives a presentation or any object that is not mounted on the material table but is attached, for example, to the wall, to be shot and shown to the audience.

Another proposed image reproduction apparatus does not have any material table but shoots a material directly placed on a table or the like with a TV camera unit. This known image reproduction apparatus without the material table has a shape similar to table lamps which are commonly used at home, and includes a TV camera unit linked to a base mounted on a table or the like via, for example, an arm.

Still another proposed image reproduction apparatus has a TV camera unit that is separable from an arm in order to provide a wider range of applications. This structure enables the user to hold the separate TV camera unit with one hand and shoot the material placed on a material table or directly on the table from various directions.

In the image reproduction apparatus having the separable TV camera unit, it is often required to take the images of the material placed on the table or the facial images of the user who gives a presentation, while the TV camera unit is fixed to the arm. In the image reproduction apparatus, the TV camera unit is accordingly required to be separable from the base and be movable between a downward shooting position and a horizontal shooting position. In the known structure, the TV camera unit is fixed to a rotatable pan head formed on one end of the arm and changes its attitude through the rotation of the pan head.

The conventional image reproduction apparatus with the separable TV camera unit, however, has the following disadvantages.

Two different actions, that is, attachment of the TV camera unit to the pan head and rotation of the pan head, are required when the separate TV camera unit is fixed to the arm to shoot the material on the table or the facial image of the user who gives a presentation. The TV camera unit is generally attached to the pan head via a screw or a like element. This further consumes time and labor of the user. Irrespective of the diversified applications, the conventional image reproduction apparatus with the separable TV camera unit can not be conveniently used.

SUMMARY OF THE INVENTION

The object of the present invention is to improve the usability of an image reproduction apparatus having a separable TV camera unit.

At least part of the above and the other related objects is realized by an image reproduction apparatus having a TV camera unit and a camera support for supporting the TV camera unit that are separable from each other. The camera support includes camera supporting means used when the TV camera unit is set at a downward shooting position where a lens of the TV camera unit faces down and when the TV camera unit is set at a horizontal shooting position where the lens of the TV camera unit faces in a horizontal direction. The TV camera unit further includes first engagement means for engaging with the camera supporting means at the downward shooting position, and second engagement means for engaging with the camera supporting means at the horizontal shooting position.

In a typical application, the image reproduction apparatus is mounted on a desk, a table, or another flat surface. When the TV camera unit is set at the downward shooting position in this typical application, the lens of the TV camera unit faces down toward the desk, the table, or another flat surface. When the TV camera unit is set at the horizontal shooting position, on the other hand, the lens of the TV camera unit faces in the horizontal direction toward the user who gives a presentation or faces the surrounding wall.

In the image reproduction apparatus of the invention, in case that the first engagement means engages with the camera supporting means, the separate TV camera unit is attached to the camera support and set at the downward shooting position where the lens faces down. In case that the second engagement means engages with the camera supporting means, on the other hand, the TV camera unit is set at the horizontal shooting position where the lens faces in the horizontal direction. A single operation of engaging the first engagement means or the second engagement means with the camera supporting means enables the separate TV camera unit to be fixed to the camera support and shoot a material on the table or a figure of the user who gives a presentation. This structure improves the usability of the image reproduction apparatus.

In accordance with one preferable application of the present invention, the TV camera unit includes the first engagement means and the second engagement means having a positional relationship that gives images of a normal orientation both at the downward shooting position and at the horizontal shooting position.

In this structure, the TV camera unit can be attached to the camera support and set at the downward shooting position or at the horizontal shooting position through the simple operation of engaging the first engagement means or the second engagement means with the camera supporting means, and give images of normal orientation at both the shooting positions. This structure does not require the lens of the TV camera unit to be rotated around its optical axis when the TV camera unit is moved from the downward shooting position to the horizontal shooting position or vice versa, nor require any electrical image processing of the output images (transformation of images of normal orientation to those of inverted orientation or vice versa). The simple engagement of the first engagement means or the second engagement means with the camera supporting means enables the image reproduction apparatus of the invention to give images of normal orientation or inverted orientation at both the downward shooting position and the horizontal shooting position.

This structure further improves the usability of the image reproduction apparatus.

The user looks at various materials, such as a written paper and a model, and gives a presentation, while the audience look at the images of such materials displayed on a monitor. In some cases, the user looks at both the materials placed on the table and attached to the wall in a normal orientation, whereas the audience look at the images of one material in the normal orientation and those of the other material in the inverted orientation. In order to avoid this situation, the user should hold one material in the normal orientation and the other material in the inverted orientation. This operation often confuses the user. Otherwise electrical image processing of the output images is required. This, however, needs an additional control apparatus and a time-consuming control operation.

In the image reproduction apparatus of the invention, the orientation of the material seen by the user who gives the presentation coincides with the orientation of the images of the material shown to the audience. The user and the audience can accordingly look at the materials and their images in the identical orientation at both the downward shooting position and the horizontal shooting position. The user is accordingly not required to check the orientation of the images during the presentation. This structure expands the field of possible applications and accelerates the spread of the image reproduction apparatus. By way of example, even a pupil of an elementary school who does not know the mechanism or principle of the image reproduction apparatus can use the image reproduction apparatus of the invention without any difficulties. One pupil can directly look at a material and give an explanation, while the other pupils look at the images of the material in the same orientation. The image reproduction apparatus can thus favorably be used in educational applications, such as natural science and social science. The expansion of possible applications and the potential users is naturally not restricted to the educational purposes.

In accordance with one preferable structure, the camera supporting means includes a support shaft having a fixed lower end and extending upright. The first engagement means is a first engagement aperture formed in a casing of the TV camera unit to receive the support shaft while making the lens of the TV camera unit face down. The second engagement means is a second engagement aperture formed in the casing of the TV camera unit to receive the support shaft while making the lens of the TV camera unit face in the horizontal direction.

In the image reproduction apparatus of this structure, the simple insertion of the support shaft into either the first engagement aperture or the second engagement aperture allows the TV camera unit to shoot the material either at the downward shooting position or at the horizontal shooting position. This structure further simplifies the operation required to fix the separate TV camera unit to the camera support and shoot the material on the table or the facial image of the user with the TV camera unit, thereby further improving the usability of the image reproduction apparatus. Even a pupil of an elementary school can thus use the image reproduction apparatus without any difficulties.

It is preferable that the first engagement aperture and the second engagement aperture have diameters that allow rotation of the TV camera unit around the support shaft.

In the image reproduction apparatus of this preferable structure, the TV camera unit is rotatable at the downward shooting position or at the horizontal shooting position set through the insertion of the support shaft into either the fist engagement aperture or the second engagement aperture. This structure enables the TV camera unit to shoot the materials placed in a wide shooting range, thus further improving the usability of the image reproduction apparatus.

In accordance with another preferable application, the first engagement aperture is formed in the casing to be parallel to an optical axis of the lens, and the second engagement aperture being formed in the casing to be perpendicular to the optical axis of the lens.

In the image reproduction apparatus of this structure, the support shaft and the lens are arranged to be parallel to each other at the downward shooting position and to be perpendicular to each other at the horizontal shooting position. In case that the support shaft is arranged upright, when the TV camera unit is set at the downward shooting position, the lens faces down to take images of the material mounted on the table. When the TV camera unit is set at the horizontal shooting position, on the other hand, the lens faces in the horizontal direction to take images of the material attached to the wall. This structure does not require the adjustment of the direction of the lens, thereby further improving the usability of the image reproduction apparatus.

In accordance with another preferable application of the present invention, the camera support further includes a base mounted on a flat surface, and an arm attached to the base and connected with the camera supporting means, the arm being in a first attitude for holding the camera supporting means above the base.

It is preferable that the of the camera support is rotatable clockwise and counterclockwise from the first attitude with respect to the base.

It is further preferable that the arm of the camera support is rotatable to a second attitude to be parallel to the base and top of the flat surface, on which the base is mounted.

In the image reproduction apparatus of this preferable structure, the optical axis of the lens of the TV camera unit set either at the downward shooting position or at the horizontal shooting position can be inclined through the rotation of the arm. This structure enables the TV camera unit to shoot the materials placed in a wide shooting range, thus further improving the usability of the image reproduction apparatus.

The arm is movable to the second attitude to be parallel to the base as well as the top face of the table or the like, so that the camera support with the base and the arm has a sufficiently small height when not in use. The image reproduction apparatus of this structure in the non-service state accordingly has the camera support having the small height and the TV camera unit separated from the camera support. This saves the space required for storing the whole image reproduction apparatus. It is further preferable that the camera supporting means is detachable from the arm. This preferable structure enables the camera supporting means to be arranged parallel to the TV camera unit and thereby further saves the space required for storing the whole image reproduction apparatus.

It is also preferable that the camera support has the arm and the camera supporting means in a state that allows the camera supporting means to be held at different positions having different heights from the base.

In the image reproduction apparatus of this structure, the TV camera unit can be held at different heights above the base, so that the shooting distance can be readily changed at the downward shooting position and the shooting height can be readily adjusted at the horizontal shooting position.

In the image reproduction apparatus of the above structure, it is further preferable that the camera supporting means of the camera support is slidable along the arm.

In the image reproduction apparatus of this structure, the height of the TV camera unit can be readily adjusted by sliding the camera supporting means along the arm.

In accordance with still another preferable application of the present invention, the TV camera unit has a microphone for collecting speech and sound from a shooting direction of the lens.

In the image reproduction apparatus of this structure, the shooting direction of the lens coincides with the direction of collecting sound and speech. This structure is especially advantageous when the TV camera unit is set at the horizontal shooting position to shoot the figures of attendants of a TV meeting. Since the speech of each attendant of the TV meeting is output through the microphone simultaneously with the output of the facial image of the attendant, the image reproduction apparatus of the invention can be favorably used as a device of the TV meeting system.

These and other objects, features, aspects, and advantages of the present invention will become more apparent from the following detailed description of the preferred embodiment with the accompanying drawings.

DESCRIPTION OF THE PREFERRED EMBODIMENTS

Figure 1:
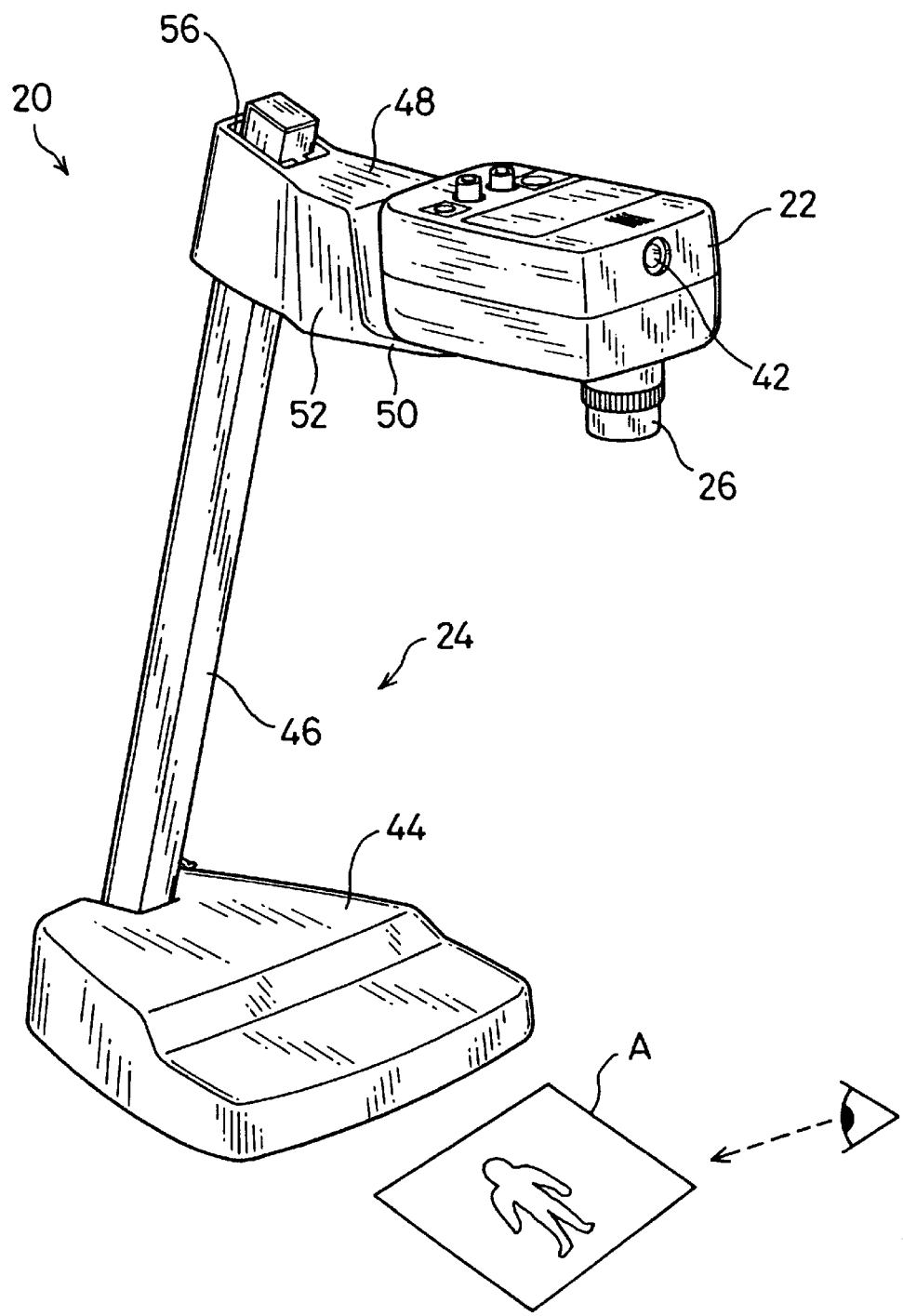
FIG. 1 is a perspective view illustrating an image reproduction apparatus 20 embodying the present invention at a downward shooting position where a lens 26 faces down.

The following describes a best mode of carrying out the present invention, based on an image reproduction apparatus embodying the present invention. FIG. 1 is a perspective view illustrating an image reproduction apparatus 20 of the embodiment.

Referring to FIG. 1, the image reproduction apparatus 20 includes a TV camera unit 22 and a camera support stand 24 for supporting the TV camera unit 22, which are separable from each other. The TV camera unit 22 has a size and a eight that allow the user to hold the TV camera unit 22 readily with one hand. The TV camera unit 22, which has a lens 26 arranged on a front face thereof, takes an image of an object located in a range facing the lens 26 and outputs an image signal representing the image to a monitor (not shown). The following describes the construction of TV camera unit 22, based on the front perspective view of FIG. 2, the rear perspective view of FIG. 3, and the vertical cross sectional view of FIG. 4.

The TV camera unit 22 has a switch 28 disposed on the left side of the lens 26 to change the shutter speed between $\frac{1}{60}$ and $\frac{1}{100}$ and a microphone (not shown) on the right side of the lens 26. The lens 26 has a lens assembly that allows manual focusing, and includes an aperture ring 30 set around the lens 26 to regulate the focal number. Although not illustrated in FIG. 4, the TV camera unit 22 has a CCD (charge coupled device) element incorporated therein for converting images taken with the lens 26 to image signals. The TV camera unit 22 is also provided, on its rear face, with a video output terminal 32 for outputting image signals, an audio output terminal 34 for outputting audio signals collected through the microphone, a S-VIDEO terminal 36, and a power terminal 38. The TV camera unit 22 accordingly outputs images as well as speech or sound to an external device through these terminals. An AC adapter (not shown) may be connected to the power terminal 38 to convert alternating current to direct current and apply a 6-V DC voltage.

Figure 2:
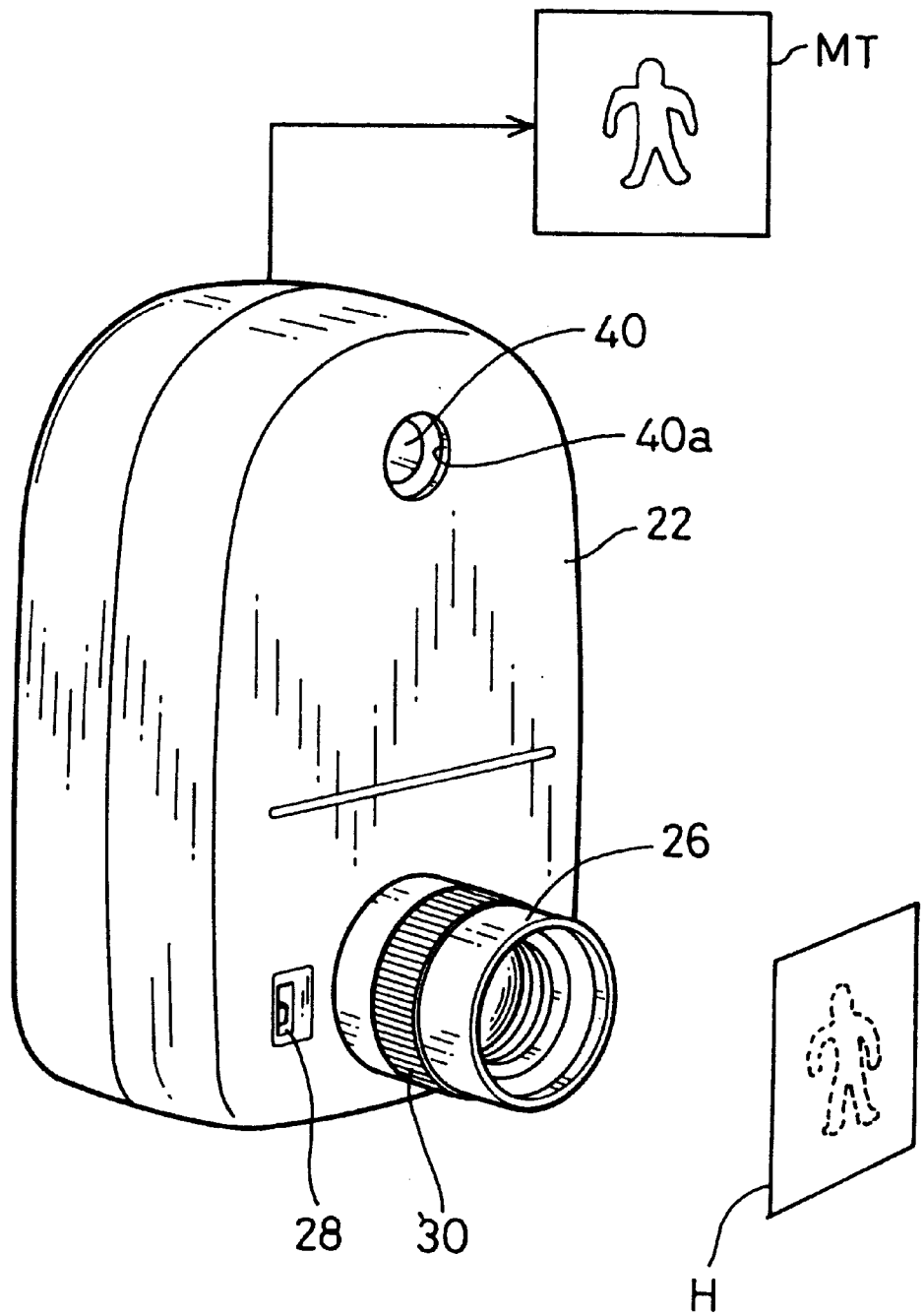
FIG. 2 is a front perspective view illustrating a TV camera unit 22.
Figure 4:
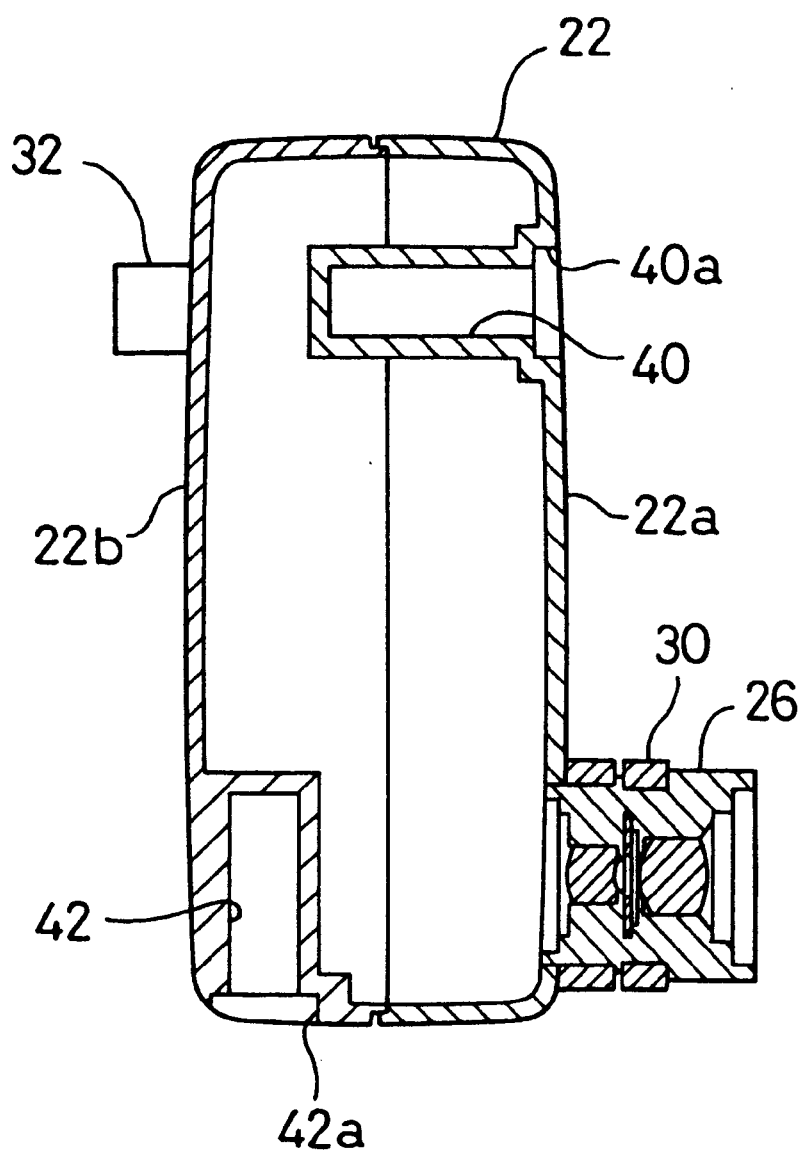
FIG. 4 is a vertical cross sectional view illustrating the TV camera unit 22.

The TV camera unit 22 further has a downward attitude holding aperture 40 for holding the TV camera unit 22 attached to the camera support stand 24 at a downward shooting position, where the lens 26 faces down, and a horizontal attitude holding aperture 42 for holding the TV camera unit 22 at a horizontal shooting position, where the lens 26 faces in the horizontal direction. Referring to FIGS. 2 and 4, the downward attitude holding aperture 40 is arranged on the front face of the TV camera unit 22 with the lens 26 and formed in a front casing 22a of the TV camera unit 22 to be parallel to the optical axis of the lens 26. The TV camera unit 22 held in the attitude shown in FIG. 2 shoots an object, such as a material, facing the lens 26 and outputs an image having the same orientation as that of the object. By way of example, when an object H faces the lens 26 in a normal orientation, the image output from the TV camera unit 22 and displayed on a monitor is also in the normal state. When the object H faces the lens 26 in an inverted orientation, on the other hand, the image displayed on the monitor is also in the inverted state. This positional relationship is determined in advance by designing an optical connection of the internal CCD element with the lens 26 of the TV camera unit 22.

Figure 3:
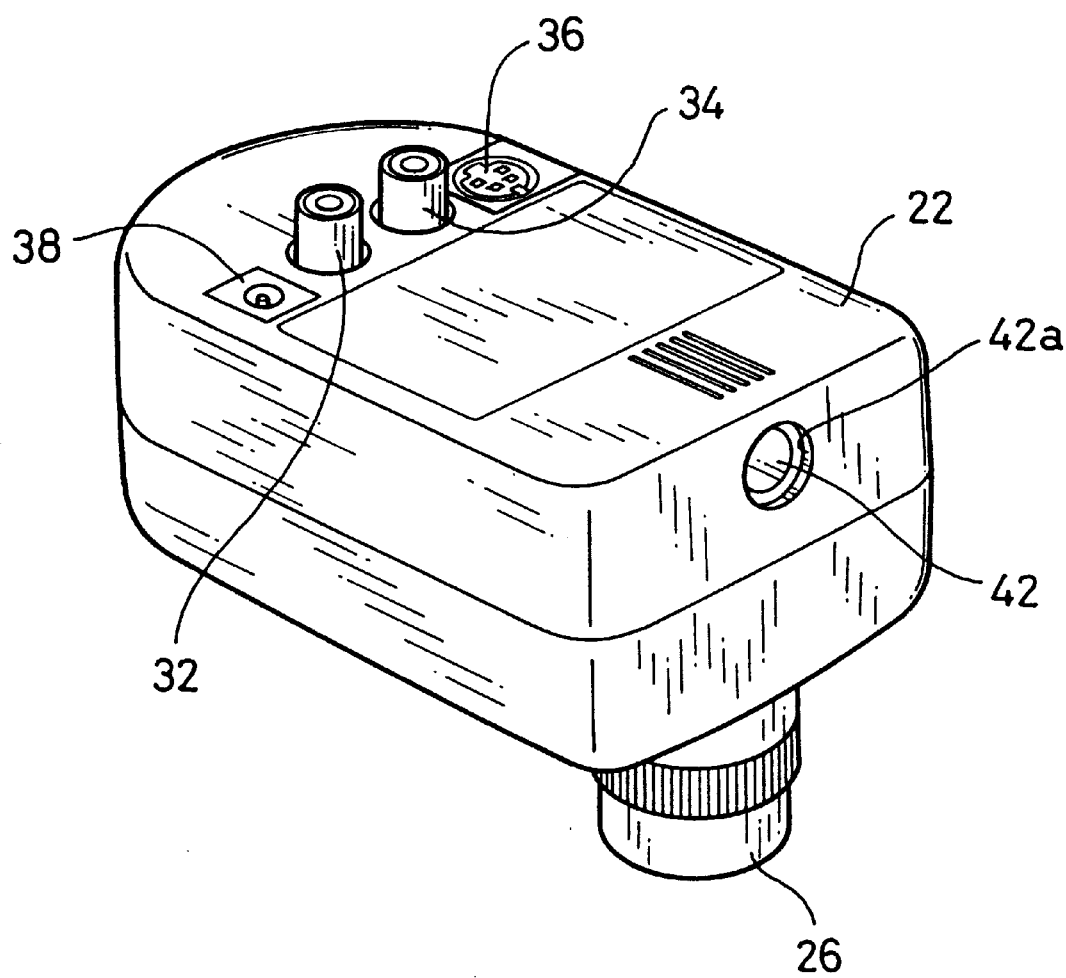
FIG. 3 is a rear perspective view illustrating the TV camera unit 22.

Referring to FIGS. 3 and 4, the horizontal attitude holding aperture 42 is arranged on the bottom face of the TV camera unit 22 and formed in a rear casing 22b of the TV camera unit 22 to be perpendicular to the optical axis of the lens 26. The downward attitude holding aperture 40 and the horizontal attitude holding aperture 42 have identical diameters, and the respective openings of these holding apertures 40 and 42 form large-diametral spot-faced openings 40a and 42a. The procedure of supporting the TV camera unit 22 with the downward attitude holding aperture 40 or the horizontal attitude holding aperture 42 will be described later.

Figure 5:
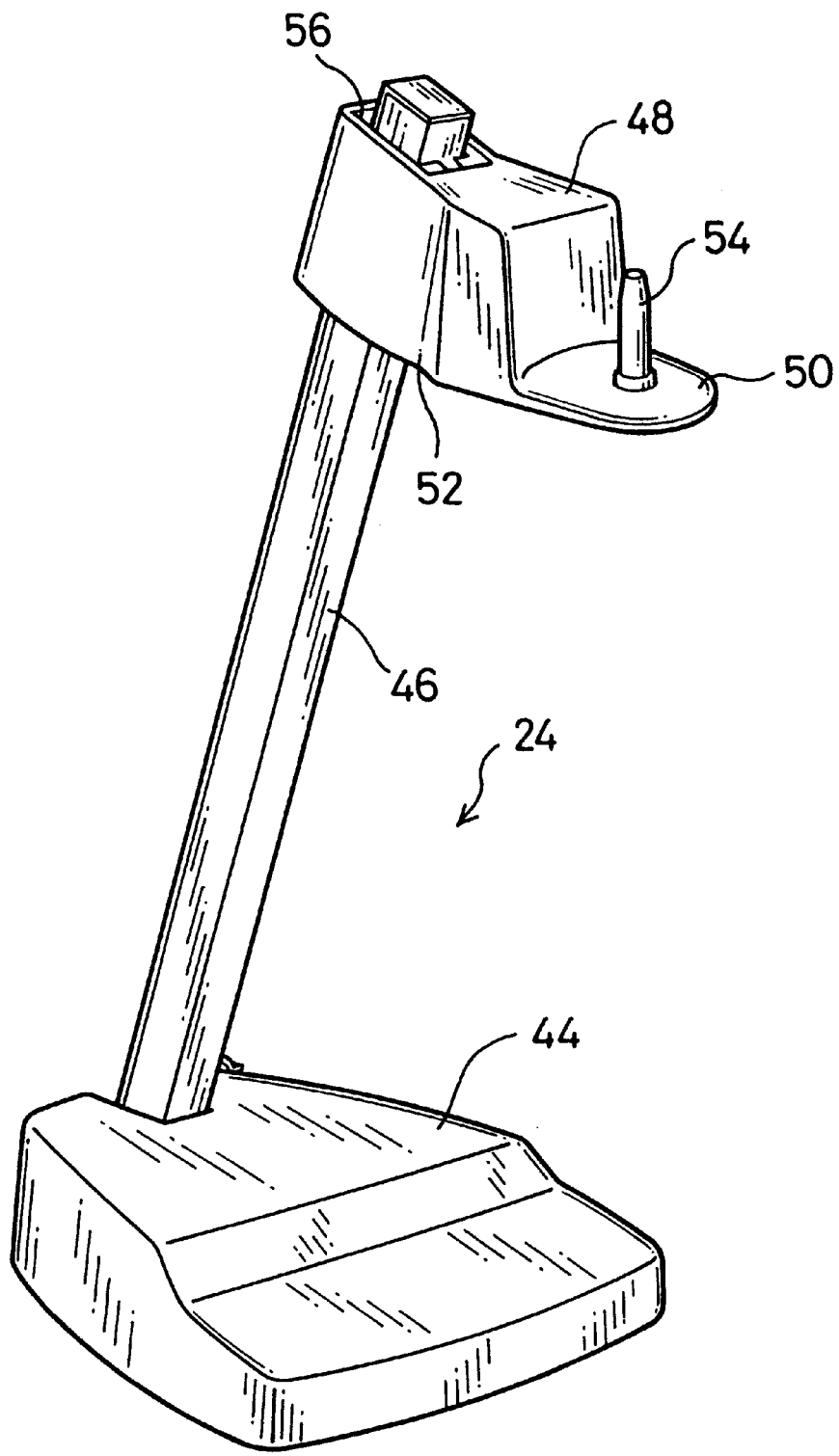
FIG. 5 is a perspective view showing structure of a camera support stand 24.
Figure 6:
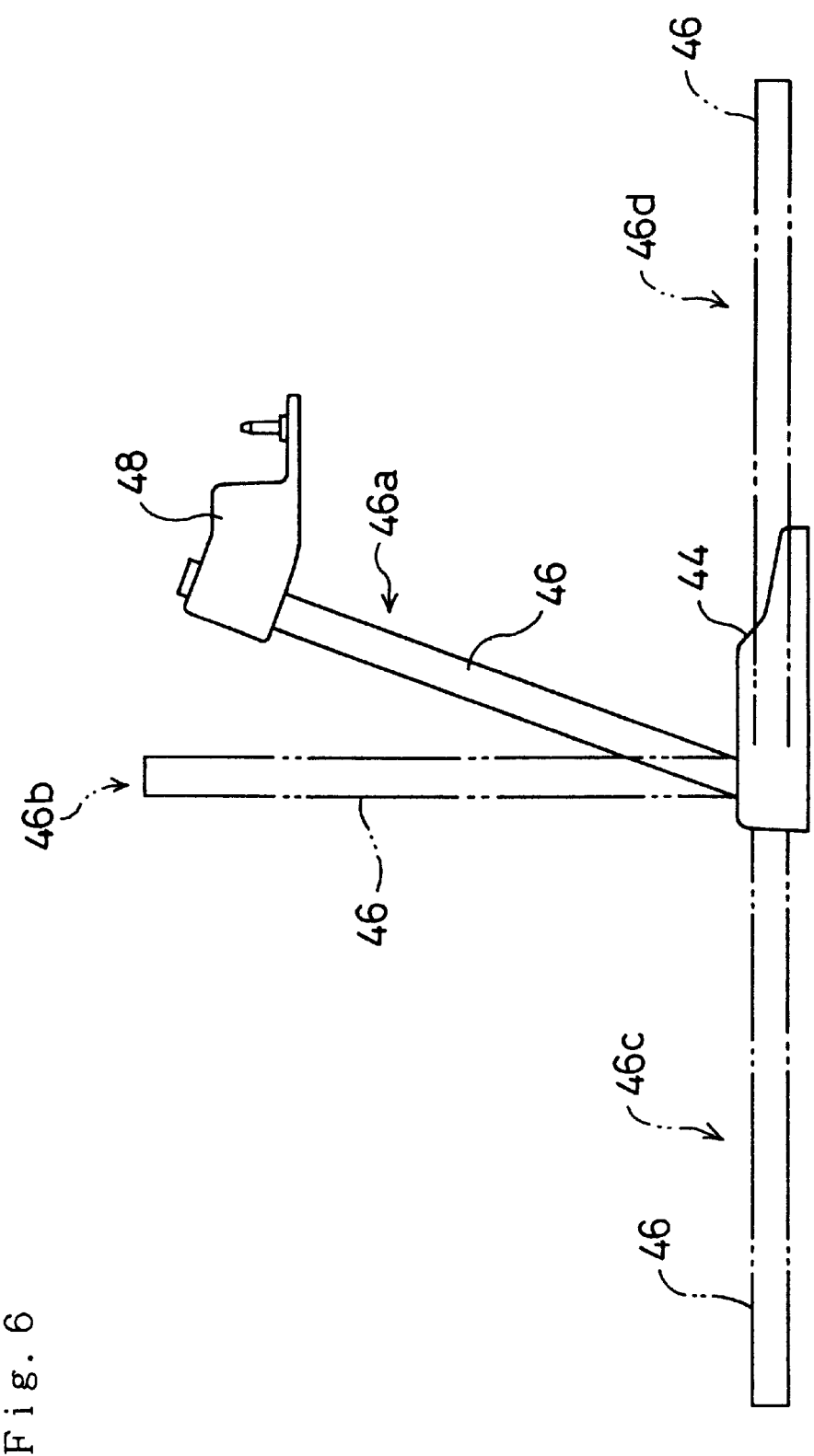
FIG. 6 schematically shows clockwise and counterclockwise rotation of an arm 46.

Referring to FIG. 1 and the perspective view of FIG. 5 without the TV camera unit 22, the camera support stand 24 has a base 44 directly placed on a desk, a table, or the like, an arm 46 extending from the base 44 to be inclined forward, and a camera support member 48 to hold the TV camera unit 22. The base 44 provides a stable and secure support for the TV camera unit 22 as shown in FIG. 1. The arm 46 has a lower end attached to the base 44 to be pivotally movable around the linkage that has a ratchet (not shown). Referring to FIG. 6, the arm 46 is pivotally movable by the ratchet between a forward attitude 46a and an upright attitude 46b where the arm 46 is upright with respect to the base 44. In the state that the ratchet is released, the arm 46 is further movable to a horizontal attitude 46c, where the arm 46 is parallel to the base 44 and the top face of the desk or table on which the base 44 is directly placed.

The camera support member 48 has a plate-like camera base 50 formed on a free end thereof and an arm engagement portion 52. A camera support shaft 54 having a fixed lower end is protruded upright from the camera base 50, whereas an arm-receiving hole 56 is formed in the arm engagement portion 52 to receive the upper end portion of the arm 46.

The camera support shaft 54 is fitted into the downward attitude holding aperture 40 or the horizontal attitude holding aperture 42 of the TV camera unit 22 to support the TV camera unit 22. The fixed lower end of the camera support shaft 54 forms a large-diametral element that is fitted in the spot-faced opening 40a or 42a of the holding aperture 40 or 42. The diameters of the downward attitude holding aperture 40 and the horizontal attitude holding aperture 42 are a little greater than the diameter of the camera support shaft 54. When the camera support shaft 54 is fitted in either the downward attitude holding aperture 40 or the horizontal attitude holding aperture 42, the TV camera unit 22 is thus rotatable around the camera support shaft 54.

The arm-receiving hole 56 is lined with friction members (not shown) on its inner walls facing each other. While the arm 46 pierces into the arm-receiving hole 56 as shown in FIG. 5, the friction members allow the camera support member 48 to vertically slide along the arm 46 and to be held at an arbitrary position of the arm 46. The arm-receiving hole 56 is formed to be inclined toward the camera support shaft 54, so as to hold the camera base 50 in the substantially horizontal attitude and the camera support shaft 54 in the substantially upright orientation while the arm 46 is inclined forward as shown in FIG. 5.

The image reproduction apparatus 20 thus constructed is used in the following manner. When the TV camera unit 22 is used to shoot an object, such as a material, mounted on a desk or a table, that is, when the TV camera unit 22 is held at the downward shooting position where the lens 26 faces down, the camera support shaft 54 of the camera support stand 24 is fitted into the downward attitude holding aperture 40 formed in the front face of the TV camera unit 22. In other words, the engagement of the upright camera support shaft 54 with the downward attitude holding aperture 40 sets the TV camera unit 22 supported by the camera base 50 at the downward shooting position with the lens 26 facing down, as shown in FIG. 1. Since the diameter of the downward attitude holding aperture 40 is a little greater than the diameter of the camera support shaft 54 as mentioned previously, the TV camera unit 22 is rotatable around the camera support shaft 54 while being kept at the downward shooting position.

In this state, the user can directly look at a material A mounted on the table and give a presentation, while the images of the material A are displayed on the monitor (not shown). The user sees the material A in a normal orientation, and the relationship between the lens 26 and the object discussed above (see FIG. 2) enables the images to be displayed on the monitor in the normal state.

Figure 7:
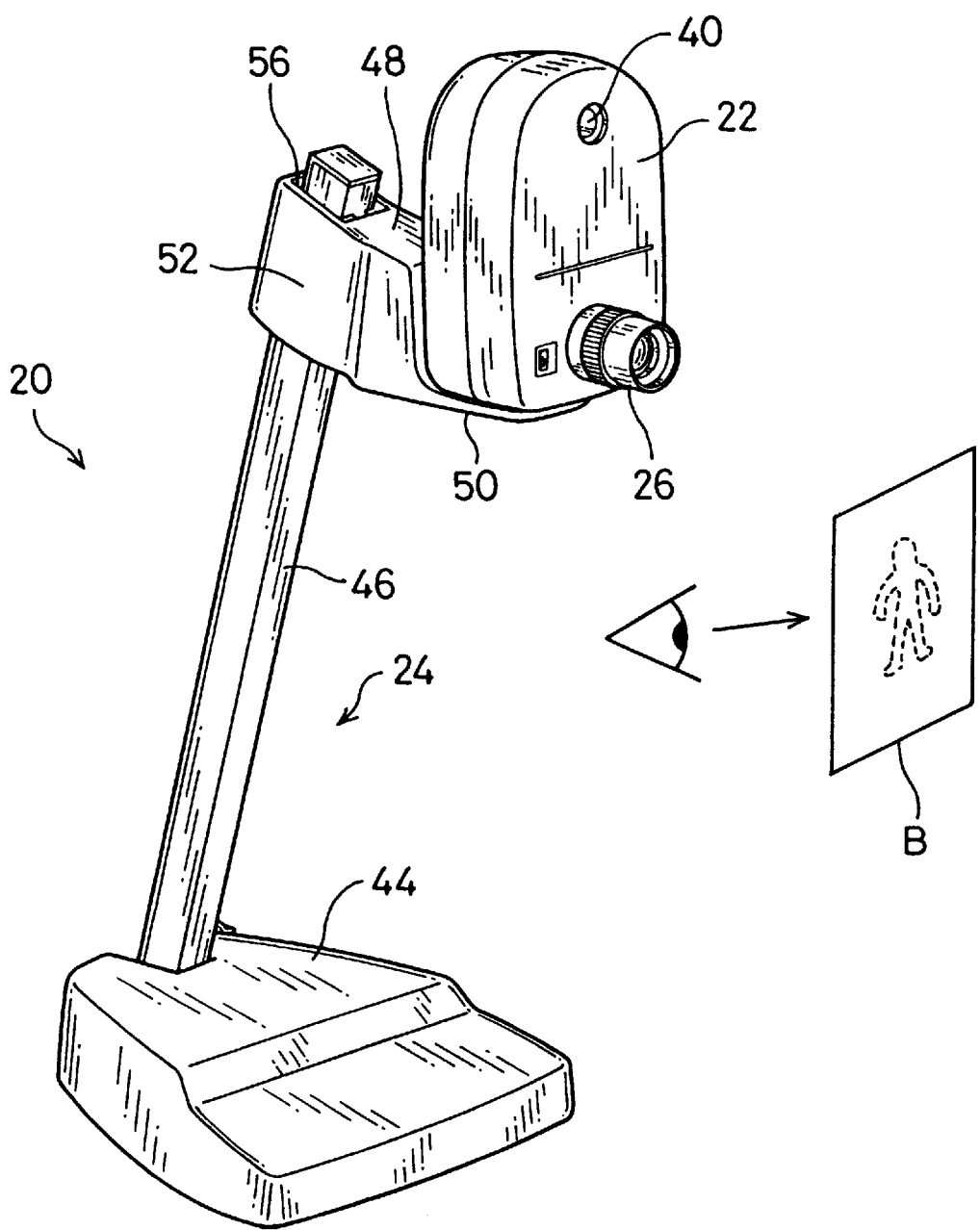
FIG. 7 is a perspective view illustrating the image reproduction apparatus 20 at a horizontal shooting position where the lens 26 faces in the horizontal direction.

When the TV camera unit 22 is used to shoot a figure of the user who gives a presentation or a material attached to a wall, that is, when the TV camera unit 22 is held at the horizontal shooting position where the lens 26 faces in the horizontal direction, the camera support shaft 54 of the camera support stand 24 is fitted into the horizontal attitude holding aperture 42 formed in the bottom face of the TV camera unit 22. In other words, the engagement of the upright camera support shaft 54 with the horizontal attitude holding aperture 42 sets the TV camera unit 22 supported by the camera base 50 at the horizontal shooting position with the lens 26 facing in the horizontal direction, as shown in FIG. 7. Since the diameter of the horizontal attitude holding aperture 42 is a little greater than the diameter of the camera support shaft 54 as mentioned previously, the TV camera unit 22 is rotatable around the camera support shaft 54 while being kept at the horizontal shooting position.

In this state, the user can directly look at a material B attached to the wall and give a presentation, while the images of the material B are displayed on the monitor (not shown). The user sees the material B in a normal orientation, and the relationship between the lens 26 and the object discussed above (see FIG. 2) enables the images to be displayed on the monitor in the normal state.

Both the downward attitude holding aperture 40 and the horizontal attitude holding aperture 42 have air holes (not shown) through which the air is released. These air holes enable the camera support shaft 54 to be smoothly fitted into the downward attitude holding aperture 40 to set the TV camera unit 22 at the downward shooting position or into the horizontal attitude holding aperture 42 to set the TV camera unit 22 at the horizontal shooting position.

As discussed above, in the image reproduction apparatus 20 of the embodiment, the TV camera unit 22 is separable from the camera support stand 24 and held with one hand to shoot a material placed at an arbitrary position and display the image of the material on the monitor. The TV camera unit 22 can be readily separated from the camera support stand 24 simply by lifting the TV camera unit 22 up and releasing the camera support shaft 54 from either the downward attitude holding aperture 40 or the horizontal attitude holding aperture 42. The TV camera unit 22 can also be readily attached to the camera support stand 24 simply by inserting the camera support shaft 54 into either the downward attitude holding aperture 40 or the horizontal attitude holding aperture 42. The image reproduction apparatus 20 of the embodiment is thus conveniently used with the easily attached and detached TV camera unit 22.

In the image reproduction apparatus 20 of the embodiment, when the camera support shaft 54 is fitted in the downward attitude holding aperture 40, the separate TV camera unit 22 is attached to the camera support stand 24 to be set at the downward shooting position with the lens 26 facing down. When the camera support shaft 54 is fitted in the horizontal attitude holding aperture 42, on the other hand, the separate TV camera unit 22 is attached to the camera support stand 24 to be set at the horizontal shooting position with the lens 26 facing in the horizontal direction. In the image reproduction apparatus 20, a single operation of fitting the camera support shaft 54 into either the downward attitude holding aperture 40 or the horizontal attitude holding aperture 42 enables the separate TV camera unit 22 to be fixed to the camera support stand 24 and shoot a material on the table or a figure of the user who gives a presentation.

This structure further improves the usability of the image reproduction apparatus 20.

In the image reproduction apparatus 20 of the embodiment, a simple operation of fitting the camera support shaft 54 into either the downward attitude holding aperture 40 or the horizontal attitude holding aperture 42 enables the TV camera unit 22 to be set at the downward shooting position or at the horizontal shooting position. This structure further improves the usability of the image reproduction apparatus 20 and allows even a pupil of an elementary school to use the image reproduction apparatus 20 without any difficulties.

In the image reproduction apparatus 20 of the embodiment, the TV camera unit 22 can be set at the downward shooting position or at the horizontal shooting position through the simple operation of fitting the camera support shaft 54 into the downward attitude holding aperture 40 or the horizontal attitude holding aperture 42 and give images of normal orientation or inverted orientation at either shooting position. This structure does not require the lens 26 of the TV camera unit 22 to be rotated around its optical axis when the TV camera unit 22 is moved from the downward shooting position to the horizontal shooting position or vice versa, nor require any electrical image processing of the output images (transformation of images of normal orientation to those of inverted orientation or vice versa). The image reproduction apparatus 20 of the embodiment conveniently gives images of normal orientation or inverted orientation at either of the downward shooting position and the horizontal shooting position and accordingly has the following advantages.

The user can directly look at the material A mounted on the table or the material B attached to the wall and give a presentation, while the audience look at the images of the material A or the material B displayed on the monitor. Since the image reproduction apparatus 20 of the embodiment gives images of normal orientation or inverted orientation at either of the downward shooting position and the horizontal shooting position as mentioned above, the orientation of the material A or B seen by the user who gives the presentation coincides with the orientation of the images of the material A or B shown to the audience. The user is accordingly not required to check the orientation of the images during the presentation. Even a pupil of an elementary school who does not know the mechanism or principle of the image reproduction apparatus 20 can use the image reproduction apparatus 20 of the embodiment without any difficulties. The presenter can directly look at a material and give an explanation, while the audience looks at the images of the material in the same orientation. The image reproduction apparatus 20 can thus favorably be used in educational applications, such as natural science and social science. This expands the field of possible applications and accelerates the spread of the image reproduction apparatus.

In the image reproduction apparatus 20 of the embodiment, the TV camera unit 22 is rotatable clockwise or counterclockwise around the camera support shaft 54 at both the downward shooting position and the horizontal shooting position set through the simple operation of fitting the camera support shaft 54 into the downward attitude holding aperture 40 or the horizontal attitude holding aperture 42. The image reproduction apparatus 20 of the embodiment can accordingly shoot materials placed in a wide shooting range with its TV camera unit 22 either at the downward shooting position or at the horizontal shooting position. This further improves the usability of the image reproduction apparatus 20.

In the image reproduction apparatus 20 of the embodiment, the downward attitude holding aperture 40 is arranged to be parallel to the optical axis of the lens 26, whereas the horizontal attitude holding aperture 42 is arranged to be perpendicular to the optical axis of the lens 26. The camera support shaft 54 is in the substantially upright orientation while the arm 46 is inclined forward as shown in FIG. 5. When the TV camera unit 22 is set at the downward shooting position, the lens 26 faces down and the image reproduction apparatus 20 can take images of the material mounted on the table with the TV camera unit 22. When the TV camera unit 22 is set at the horizontal shooting position, on the other hand, the lens 26 faces in the horizontal direction and the image reproduction apparatus 20 can take images of the material attached to the wall with its TV camera unit 22. This structure does not reguire the adjustment of the direction of the lens 26, thereby further improving the usability of the image reproduction apparatus 20.

Figure 8:
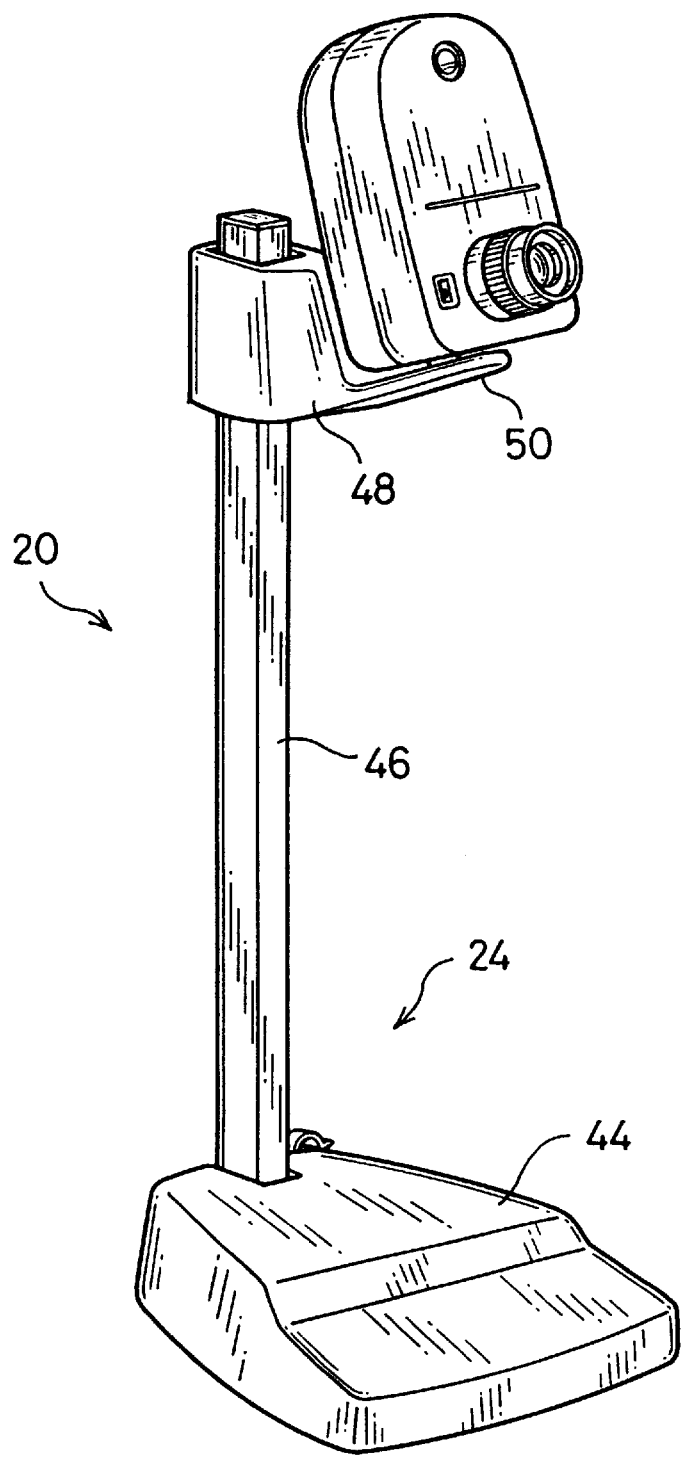
FIG. 8 is a perspective view illustrating the image reproduction apparatus 20 at the horizontal shooting position where the arm 46 is in an upright attitude to be arranged upright with respect to a base 44.

In the image reproduction apparatus 20 of the embodiment, the arm 46 with the camera support member 48 is attached on its lower end to the base 44 to allow pivotal movement of the arm 46 around the linkage. The arm 46 is pivotally movable between the forward attitude 46a and the upright attitude 46b where the arm 46 is upright with respect to the base 44. This structure enables the optical axis of the lens 26 of the TV camera unit 22 set at the horizontal shooting position to be inclined upward as shown in FIG. 8. This is also true when the TV camera unit 22 is set at the downward shooting position. The image reproduction apparatus 20 of the embodiment can accordingly shoot materials placed in a wide shooting range with its TV camera unit 22 either at the downward shooting position or at the horizontal shooting position. This further improves the usability of the image reproduction apparatus 20.

In the image reproduction apparatus 20 of the embodiment, the camera support member 48 is vertically slidable along the arm 46 attached to the base 44 and can be held at an arbitrary position of the arm 46. This enables the TV camera unit 22 to be held at a desired height, so that the shooting distance can be readily changed at the downward shooting position and the shooting height can be readily adjusted at the horizontal shooting position.

Figure 9:
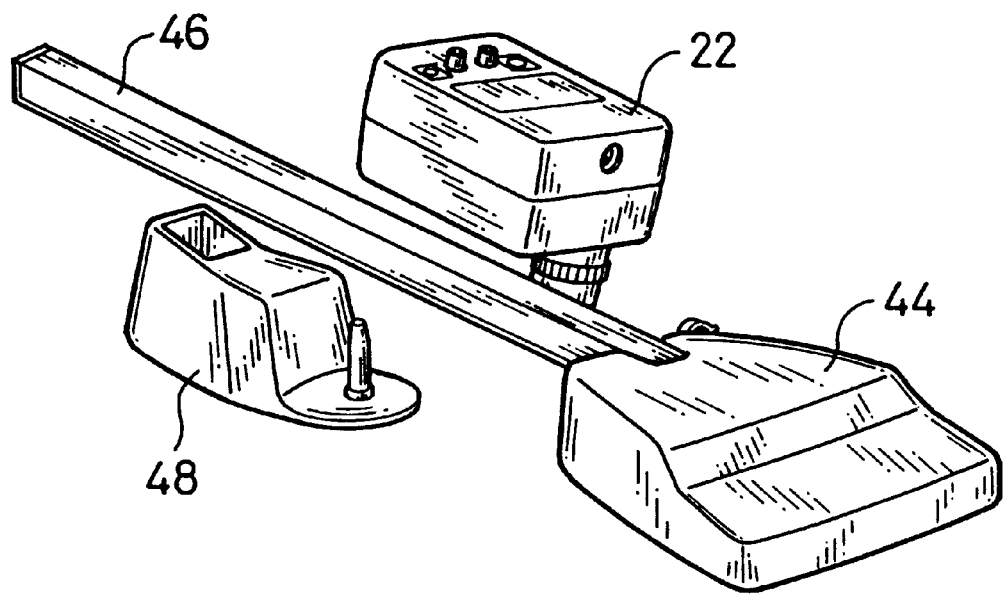
FIG. 9 shows the disassembled image reproduction apparatus 20 for storage.

The arm 46 is also movable to the horizontal attitude 46c, where the arm 46 is parallel to the base 44 as shown in FIG. 6. The image reproduction apparatus 20 of the embodiment can be made sufficiently compact in the state of FIG. 9, in which the arm 46 is pulled down to be parallel to the base 44 and the separate TV camera unit 22 and the separate camera support member 48 are arranged next to the arm 46. This structure saves the space required for storing the whole image reproduction apparatus 20.

As discussed above, the image reproduction apparatus 20 of the embodiment has a microphone (not shown) on the right side of the lens 26. This structure is especially advantageous when the TV camera unit 22 is set at the horizontal shooting position as shown in FIG. 7 to shoot the figures of attendants of a TV meeting. Since the speech of each attendant of the TV meeting is output through the microphone simultaneously with the output of the facial image of the attendant, the image reproduction apparatus 20 of the embodiment can be favorably used as a device of the TV meeting system. The TV camera unit 22 may be placed directly on the table to enable the lens 26 to be a little inclined upward and shoot the face of each attendant.

The present invention is not restricted to the above embodiment, but there may be many modifications, changes, and alterations without departing from the scope or spirit of the main characteristics of the present invention. Examples of possible modification are given below.

In the above embodiment, the camera support member 48 has the camera support shaft 54, whereas the TV camera unit 22 has the downward attitude holding aperture 40 and the horizontal attitude holding aperture 42. In accordance with another possible structure, the camera support member 48 may have a camera holding aperture, while the TV camera unit 22 has a downward attitude support shaft and a horizontal attitude support shaft that are fitted into the camera holding aperture and arranged at the positions corresponding to the downward attitude supporting aperture 40 and the horizontal attitude supporting aperture 42.

Figure 10:
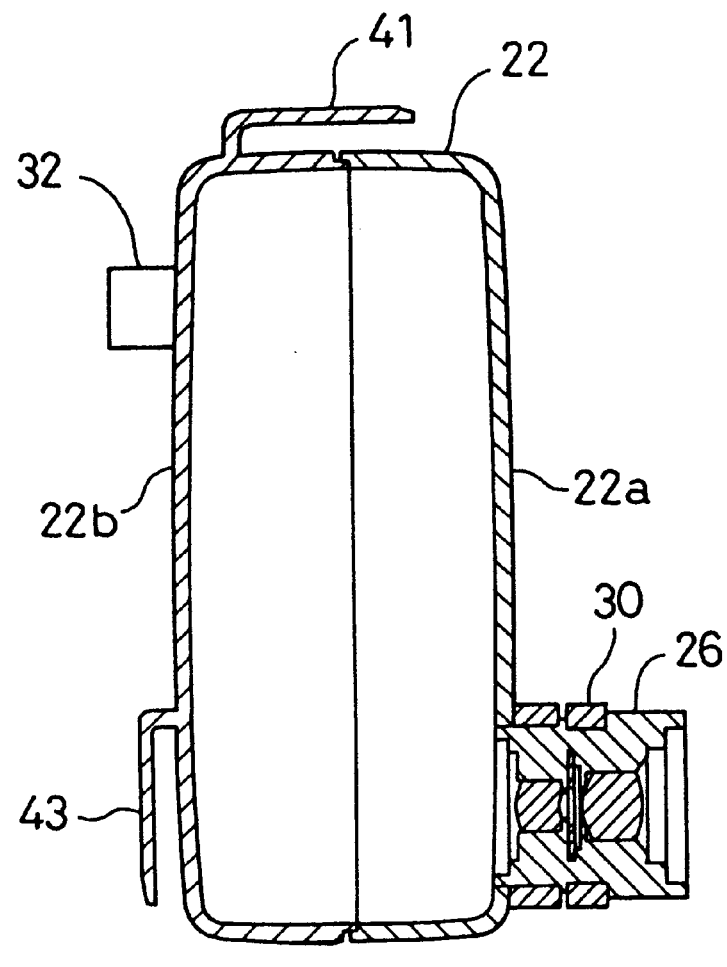
FIG. 10 is a vertical cross sectional view illustrating the TV camera unit 22 of modified structure.
Figure 10:
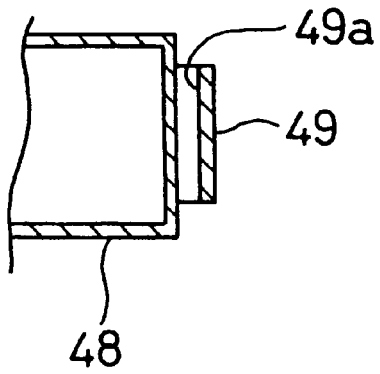
Figure 11:
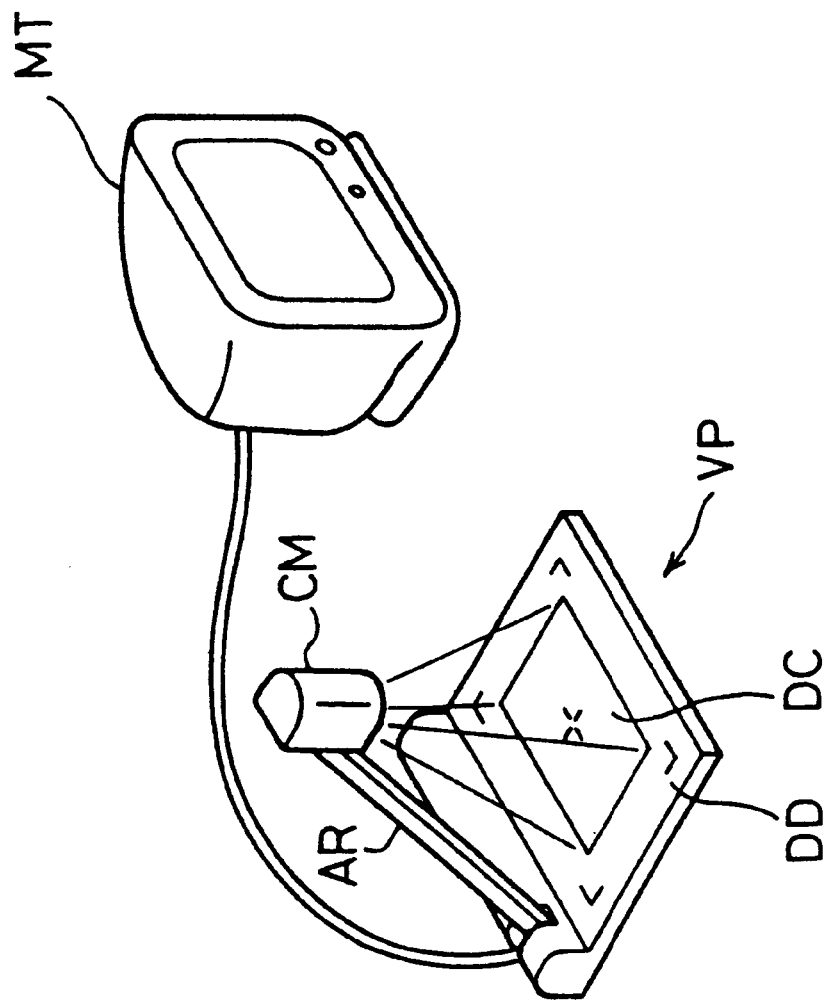
FIG. 11 illustrates a conventional image reproduction apparatus VP.

In accordance with still another possible structure shown in FIG. 10, the TV camera unit 22 may have a downward attitude supporting tongue 41 formed on the upper end face thereof and a horizontal attitude supporting tongue 43 formed on the rear face thereof, whereas the camera support member 48 includes a camera holding bridge 49 having an opening 49a for receiving either the downward attitude supporting tongue 41 or the horizontal attitude supporting tongue 43. The downward attitude supporting tongue 41 is formed to be parallel to the optical axis of the lens 26 and has a free end located on the side of the lens 26. The horizontal attitude supporting tongue 43 is formed to be perpendicular to the optical axis of the lens 26 and has a free end located on the side of the bottom face of the TV camera unit 22. The TV camera unit 22 is set at the downward shooting position when the downward attitude supporting tongue 41 is inserted into the opening 49a of the camera holding bridge 49. The TV camera unit 22 is set at the horizontal shooting position, on the other hand, when the horizontal attitude supporting tongue 43 is inserted into the opening 49a of the camera holding bridge 49. The image reproduction apparatus having the TV camera unit 22 of this structure can exert the same effects as those of the above embodiment.

In accordance with another possible structure, the arm 46 is movable to a second horizontal attitude 46d, which is rotated by 180 degrees from the horizontal attitude 46c, as shown in FIG. 6. This structure allows the arm 46 to be arranged parallel to the base 44 and to be partly received in the base 44, thereby further saving the space required for storing the whole image reproduction apparatus.

The arm 46 may be made of a flexible tube having sufficient flexibility or formed as an adjustable arm with one or a plurality of joints, in order to support the TV camera unit at a desired height through a simple operation.

It should be clearly understood that the above embodiment is only illustrative and not restrictive in any sense. The scope and spirit of the present invention are limited only by the terms of the appended claims.

What is claimed is:

1. An image reproduction apparatus comprising:
    a TV camera unit;
    a camera support for supporting said TV camera unit, said TV camera unit and said camera support being separable from each other, wherein said camera support comprises a camera supporting means, wherein said camera supporting means comprises a support shaft having a fixed lower end and extending upright, said camera supporting means being used in common when said TV camera unit is set at a downward shooting position where a lens of said TV camera unit faces down and when said TV camera unit is set at a horizontal shooting position where said lens of said TV camera unit faces in a horizontal direction;
    a first engagement aperture formed in a casing of said TV camera unit to receive said support shaft while making said lens of said TV camera unit face down in the downward shooting position; and
    a second engagement aperture formed in the casing of said TV camera unit to receive said support shaft while making said lens of said TV camera unit face in the horizontal direction in the horizontal shooting position, wherein said first engagement aperture and said second engagement aperture have a positional relationship that gives images of a normal orientation both at the downward shooting position and at the horizontal shooting position.

2. An image reproduction apparatus in accordance with claim 1, wherein said first engagement aperture and said second engagement aperture have diameters that allow rotation of said TV camera unit around said support shaft.

3. An image reproduction apparatus in accordance with claim 2, wherein said TV camera unit has a microphone for collecting speech and sound from a shooting direction of said lens.

4. An image reproduction apparatus in accordance with claim 2, wherein said camera support further comprises:
    a base mounted on a flat surface; and
    an arm attached to said base and connected with said camera supporting means, said arm being in a first attitude for holding said camera supporting means above said base.

5. An image reproduction apparatus in accordance with claim 2, wherein said first engagement aperture is formed in said casing to be parallel to an optical axis of said lens,
    said second engagement aperture being formed in said casing to be perpendicular to the optical axis of said lens.

6. An image reproduction apparatus in accordance with claim 5, wherein said camera support further comprises:
    a base mounted on a flat surface; and
    an arm attached to said base and connected with said camera supporting means, said arm being in a first attitude for holding said camera supporting means above said base.

7. An image reproduction apparatus in accordance with claim 5, wherein said TV camera unit has a microphone for collecting speech and sound from a shooting direction of said lens.

8. An image reproduction apparatus in accordance with claim 1, wherein said camera support further comprises:
    a base mounted on a flat surface; and
    an arm attached to said base and connected with said camera supporting means, said arm being in a first attitude for holding said camera supporting means above said base.

9. An image reproduction apparatus in accordance with claim 1, wherein said TV camera unit has a microphone for collecting speech and sound from a shooting direction of said lens.

10. An image reproduction apparatus comprising:
    a TV camera unit;
    a camera support for supporting said TV camera unit, said TV camera unit and said camera support being separable from each other, wherein said camera comprises a holding member having an aperture formed in an upper portion thereof, and wherein said camera support is used in common when said TV camera unit is set at a downward shooting position where a lens of said TV camera unit faces down and when said TV camera unit is set at a horizontal shooting position where said lens of said TV camera unit faces in a horizontal direction;

a first engagement means engaging with and disengaging from said camera support, said first engagement means has a first engagement piece provided on said casing of said TV camera unit in such a way that said first engagement piece is received in said aperture of said holding member while making said lens of said TV camera unit face down at the downward shooting position; and a second engagement means engaging with and disengaging from said camera support, said second engagement means has a second engagement piece provided on said casing of said TV camera unit in such a way that said second engagement piece is received in said aperture of said holding member while making said legs of said TV camera unit face in said horizontal direction at the horizontal shooting position, wherein said first engagement means and said second engagement means have a positional relationship that gives images of a normal orientation both at the downward shooting position and at the horizontal shooting position.

11. An image reproduction apparatus comprising:

a base;

an arm coupled to said base;

a camera support member coupled to said arm; and a TV camera unit detachably coupled to said camera support member, said TV camera unit having a first aperture formed therein for said detachable coupling to said camera support member when said TV camera unit is set at a downward shooting position where a lens of said TV camera unit faces down, and said TV camera unit having a second aperture formed therein for said detachable coupling to said camera support member when said TV camera unit is set is set at a horizontal shooting position where said lens of said TV camera unit faces in a horizontal direction.

12. An image reproduction apparatus in accordance with claim 11, wherein said TV camera unit generates images of a normal orientation both at the downward shooting position and at the horizontal shooting position.

13. An image reproduction apparatus in accordance with claim 12, wherein said camera support member comprises a support shaft having a fixed lower end and extending upright;

wherein said first aperture receives said support shaft while making said lens of said TV camera unit face down; and wherein said second aperture receives said support shaft while making said lens of said TV camera unit face in the horizontal direction.

14. An image reproduction apparatus in accordance with claim 13, wherein said first and second apertures have diameters that allow rotation of said TV camera unit around said support shaft.

15. An image reproduction apparatus in accordance with claim 14, wherein said first aperture is formed in TV camera unit to be parallel to an optical axis of said lens, and wherein said second aperture is formed in said TV camera unit to be perpendicular to said optical axis of said lens.

16. An image reproduction apparatus in accordance with claim 11, wherein said arm is rotatable integrally with said base, clockwise and counterclockwise relative to said base so that said arm is in a first attitude for holding said camera support member above said base and said arm in a second attitude corresponding to clockwise and counterclockwise rotation from said first attitude relative to said base.

17. An image reproduction apparatus in accordance with claim 16, wherein said arm is rotatable to be parallel to said base.

18. An image reproduction apparatus in accordance with claim 11, wherein said coupling of said camera support member to said arm is adjustable such that said camera support member is held different positions having different heights from said base.

19. An image reproduction apparatus in accordance with claim 18, wherein said camera support member is slideable along said arm.

20. An image reproduction apparatus in accordance with claim 11, wherein said TV camera unit has a microphone for collecting speech and sound from a shooting direction of said lens.

* * * * *